US012808500B1

(12) United States Patent
Chen

(10) Patent No.: US 12,808,500 B1
(45) Date of Patent: Nov. 24, 2026

(54) THREE-WIRE DUAL-CONTROL LIGHT STRING

(71) Applicant: Huizhou Endy Lighting Co., Ltd., Guangdong (CN)

(72) Inventor: Kunpeng Chen, Jiujiang (CN)

(73) Assignee: Huizhou Endy Lighting Co., Ltd., Huizhou (CN)

( * ) Notice: Subject to any disclaimer, the term of this patent is extended or adjusted under 35 U.S.C. 154(b) by 7 days.

(21) Appl. No.: 19/257,285

(22) Filed: Jul. 1, 2025

(30) Foreign Application Priority Data

Jun. 23, 2025 (CN) ......................... 202521286848.5

(51) Int. Cl.
*F21S 4/20* (2016.01)
*F21V 21/002* (2006.01)
*F21V 23/00* (2015.01)
*F21V 23/06* (2006.01)

(52) U.S. Cl.
CPC .............. *F21S 4/20* (2016.01); *F21V 21/002* (2013.01); *F21V 23/001* (2013.01); *F21V 23/06* (2013.01)

(58) Field of Classification Search
CPC ........ F21S 4/20; F21V 21/002; F21V 23/001; F21V 23/06
See application file for complete search history.

(56) References Cited

U.S. PATENT DOCUMENTS 4,667,276 A * 5/1987 Cheng ....................... F21S 4/10 362/249.16
4,777,573 A * 10/1988 Liao ...................... F21V 21/002 313/51
5,366,386 A * 11/1994 Liao ...................... F21V 21/002 439/425
6,079,848 A * 6/2000 Ahroni ................... H01R 4/242 439/699.1
12,055,275 B1 * 8/2024 Zou ........................... F21S 4/10
12,331,895 B1 * 6/2025 Chen ..................... F21V 19/006
12,422,111 B1 * 9/2025 Chen ......................... F21S 4/10
2002/0105281 A1 * 8/2002 Openiano .............. H05B 39/00 315/185 S
2008/0009165 A1 * 1/2008 Tseng .................... F21V 21/002 439/257
2008/0157688 A1 * 7/2008 Gibboney ............ H05B 45/395 315/185 S
2011/0215368 A1 * 9/2011 Chen .................... H01R 4/2433 257/676
2019/0277458 A1 * 9/2019 Shao ......................... F21S 4/26

* cited by examiner

*Primary Examiner* — Leah Macchiarolo
(74) *Attorney, Agent, or Firm* — Justin Lampel

(57) ABSTRACT

A three-wire dual-control light string is provided, including multiple first lamp holders, multiple second lamp holders, and three parallel conductors. The multiple first lamp holder and the multiple second lamp holder are connected in parallel by the three parallel conductors, the three conductors are a first conductor, a second conductor and a third conductor, respectively. Each of the first lamp holder and the second lamp holder includes a lamp base, a lamp cover and a conductive copper terminal; the lamp base is in snap-fit with the lamp cover, and the three parallel conductors are clamped between the lamp base and the lamp cover. According to the three-wire dual-control light string, dual-loop control can be implemented after a controller is externally connected, thereby achieving interval flickering between bulbs, and significantly improving the functionality and visual appeal of an outdoor light string.

6 Claims, 17 Drawing Sheets

A-A

THREE-WIRE DUAL-CONTROL LIGHT STRING

TECHNICAL FIELD

The present disclosure relates to the technical field of light strings, and in particular to a three-wire dual-control light string.

BACKGROUND

In daily outdoor decoration and lighting scenarios, conventional outdoor light strings are widely used in festivals, courtyard decoration, exterior decoration of commercial shops and other scenarios with the advantages of convenient mounting and low cost. Such a light string universally adopts a dual-conductor structure, a lamp base, which is one of core components of the light string, is provided with two copper blade terminals to accurately insert into two conductors, respectively. One of the conductors is used as a live wire for current transmission, and the other is a null wire, thereby forming a complete current loop to provide electric energy for bulbs on the light string. Due to its circuit design principle, such a lamp base can only enable single-wire control, forcing all bulbs to operate synchronously in practical use, either flickering or extinguishing simultaneously, resulting in poor user experience.

SUMMARY

An objective of the present disclosure is to provide a three-wire dual-control light string to solve the foregoing problems.

The present disclosure can implement the foregoing objective through the following technical solutions:

- a three-wire dual-control light string includes multiple first lamp holders, multiple second lamp holders, and three parallel conductors. The multiple first lamp holders and the multiple second lamp holders are connected in parallel by the three parallel conductors, and the three parallel conductors are a first conductor, a second conductor and a third conductor.
- each of the first lamp holder and the second lamp holder includes a lamp base, a lamp cover and a conductive copper terminal. The lamp base is in snap-fit with the lamp cover, the three parallel conductors are clamped between the lamp base and the lamp cover, and the conductive copper terminal is connected to the second conductor. A first conductive sheet is arranged on the lamp base of the first lamp holder, a first tip portion is formed on the first conductive sheet, and the first tip portion is connected to the first conductor. A second conductive sheet is arranged on the lamp base of the second lamp holder, a second tip portion is formed on the second conductive sheet, and the second tip portion is connected to the third conductor.

The first conductor and the second conductor form a first loop control, and the second conductor and the third conductor form a second loop control.

In some implementations, the lamp cover is provided with three upper wire-clamping slots side by side, the lamp base is provided with three lower wire-clamping slots side by side, and wire passing holes for clamping the three parallel conductors are formed after the lamp base is in snap-fit with the lamp cover.

In some implementations, a lower side of the lamp cover is formed with a connecting latch tab, and the lamp base is provided with a connecting latch hole corresponding to the lamp cover, and the connecting latch tab is in snap-fit with the connecting latch hole to assemble the lamp base and the lamp cover into a whole.

In some implementations, an insulating partition is arranged at an upper portion of the lamp base, the middle of the insulating partition is provided with a first retaining socket, and a side edge of the insulating partition is provided with a second retaining socket.

The conductive copper terminal is in clamped into the first retaining socket and embedded into an inner top of the insulating partition.

The first conductive sheet or the second conductive sheet is embedded into the second retaining socket and extends to an inner side surface of the lamp base.

In some implementations, a terminal body of the conductive copper terminal is "L"-shaped, a conductive tip portion is formed at an upper side of the terminal body, and after the conductive copper terminal is in snap-fit with the first retaining socket, the conductive tip portion is located above the partition and penetrates into the second conductor for electric conduction.

In some implementations, a conductive body of each of the first conductive sheet and the second conductive sheet is micro-arc shaped, the first tip portion formed on the first conductive sheet and the second tip portion formed on the second conductive sheet are formed on left and right sides of upper ends of the corresponding conductive main bodies, respectively, making the first tip portion penetrate into the first conductor for electric conduction and the second tip portion penetrate into the third conductor for electric conduction.

In some implementations, an upper side surface of the conductive body is provided with a plurality of contact protrusions.

In some implementations, an inner side of the lamp base is provided with threads for connecting a bulb.

In some implementations, a side edge of the lamp cover is provided with a pothook.

The present disclosure has the beneficial effects that: the three-wire dual-control light string can achieve dual-loop control after an external controller is connected, which can achieve interval blinking between bulbs, thereby significantly improving the functionality and visual appeal of an outdoor light string

BRIEF DESCRIPTION OF THE DRAWINGS

To describe the technical solutions of embodiments of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

Figure 1:
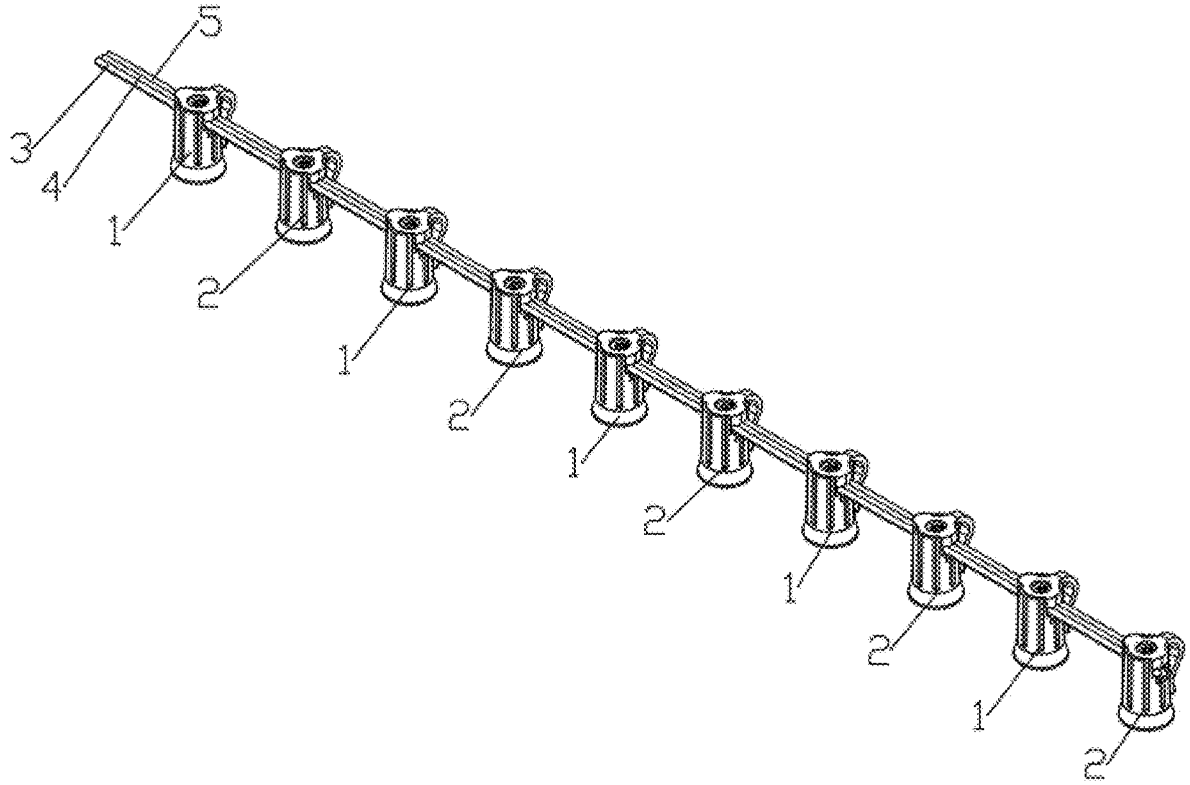
FIG. 1 is a perspective diagram of a three-wire dual-control light string according to the present disclosure.

Reference numerals are as follows:

1—first lamp holder; 101—conductive copper terminal; 101A—conductive tip portion; 102—first conductive sheet; 102A—first tip portion; 102B—contact protrusion; 103—lamp cover; 103A—handle; 103B—upper wire—clamping slot; 103C—connecting latch tab; 104—lamp base; 104A—lower wire-clamping slot; 104B—connecting latch hole; 104C—insulating partition; 104D—first retaining socket; 104E—second retaining socket; 2—second lamp holder; 201—second conductive sheet; 201A—second tip portion; 3—first conductor; 4—second conductor; 5—third conductor.

DETAILED DESCRIPTION OF THE EMBODIMENTS

To make the objectives, technical solutions and advantages of the present disclosure more clearly, the following describes the technical solutions in the embodiments of the present disclosure in detail. Apparently, the described embodiments are merely a part rather than all of the embodiments of the present disclosure. All other embodiments obtained by those of ordinary skill in the art based on the embodiments of the present disclosure without creative efforts shall fall within the scope of protection of the present disclosure.

With reference to FIG. 1 to FIG. 17, the present disclosure provides a three-wire dual-control light string includes multiple first lamp holders 1, multiple second lamp holders 2, and three parallel conductors. The multiple first lamp holders 1 and the multiple second lamp holders 2 are connected in parallel by the three parallel conductors, and the three parallel conductors are a first conductor 3, a second conductor 4 and a third conductor 5. The multiple first lamp holders 1 and the multiple second lamp holders 2 can be arranged alternately or in any combination.

Figure 2:
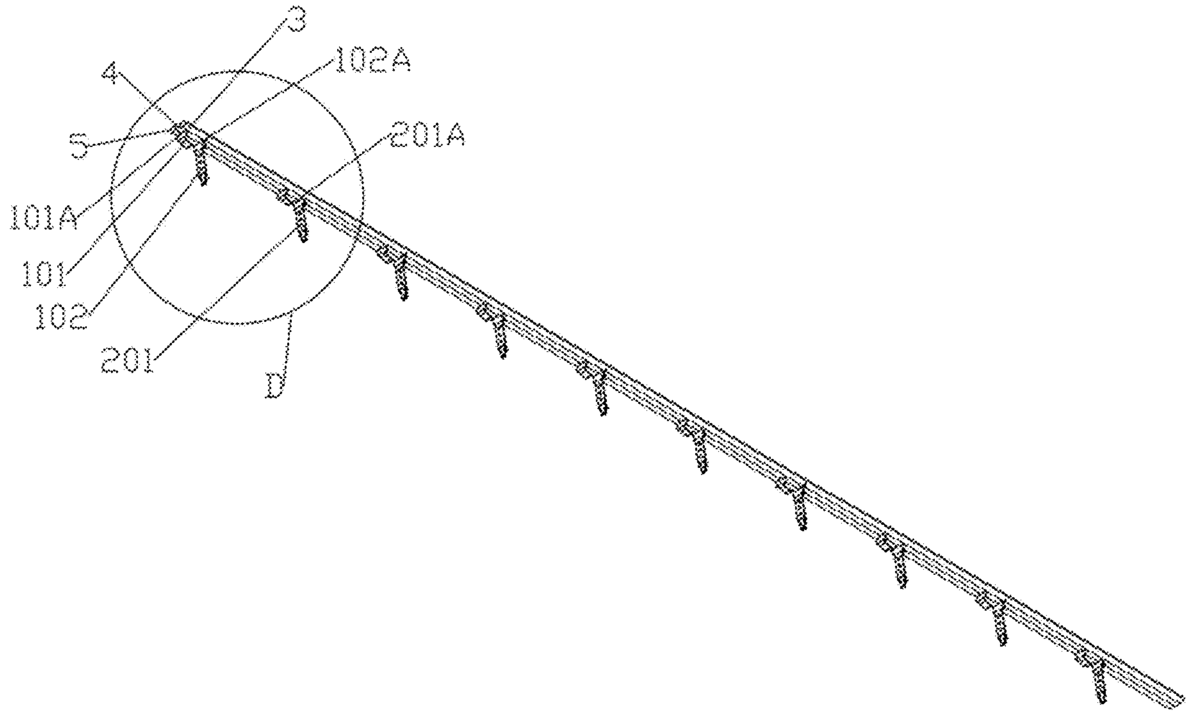
FIG. 2 is a diagram of a connection between a three-wire dual-control light string and a conductive sheet according to the present disclosure.
Figure 3:
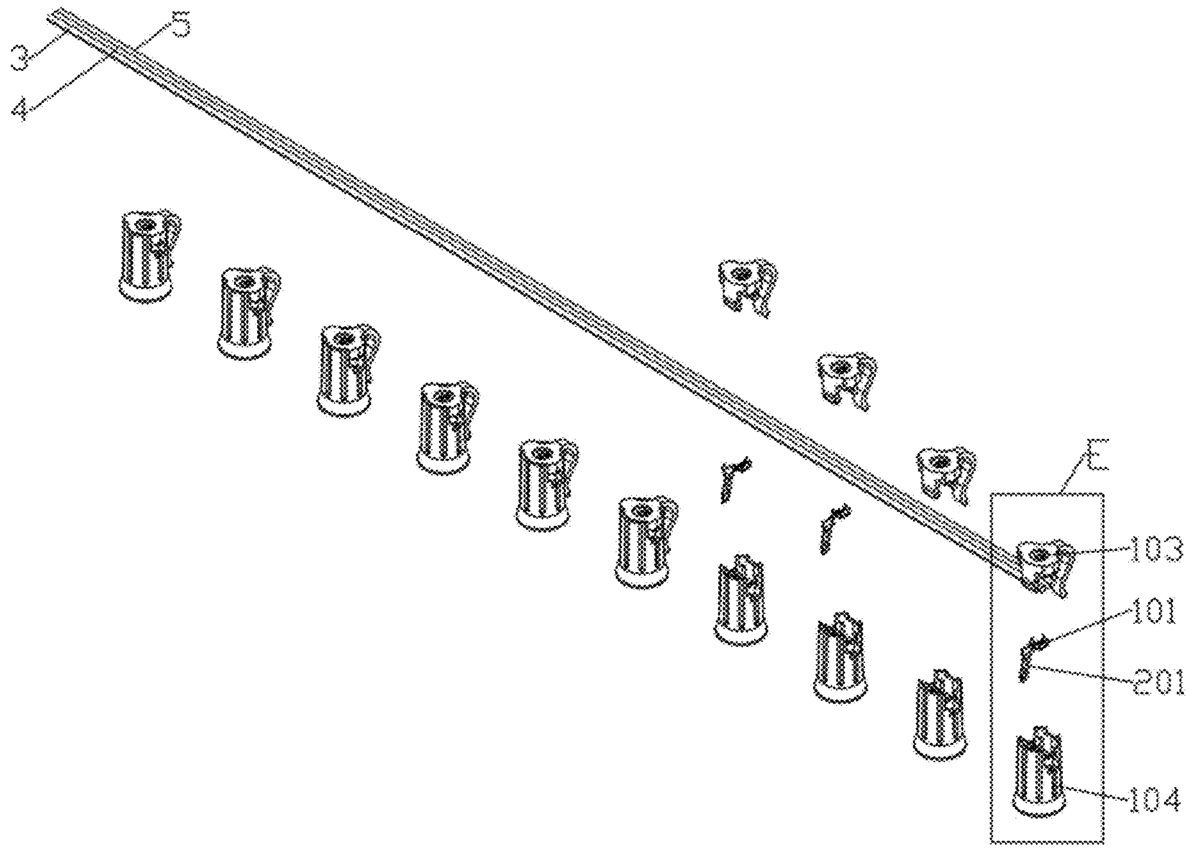
FIG. 3 is an exploded view of a three-wire dual-control light string according to the present disclosure.
Figure 4:
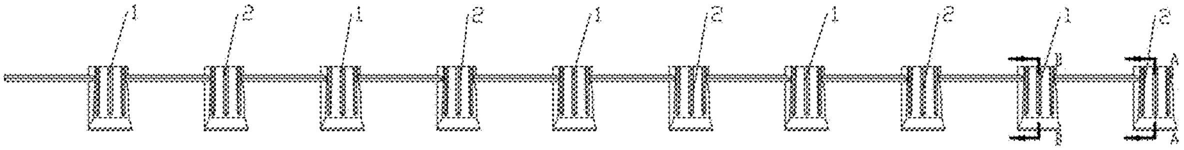
FIG. 4 is a front view of a three-wire dual-control light string according to the present disclosure.
Figure 5:
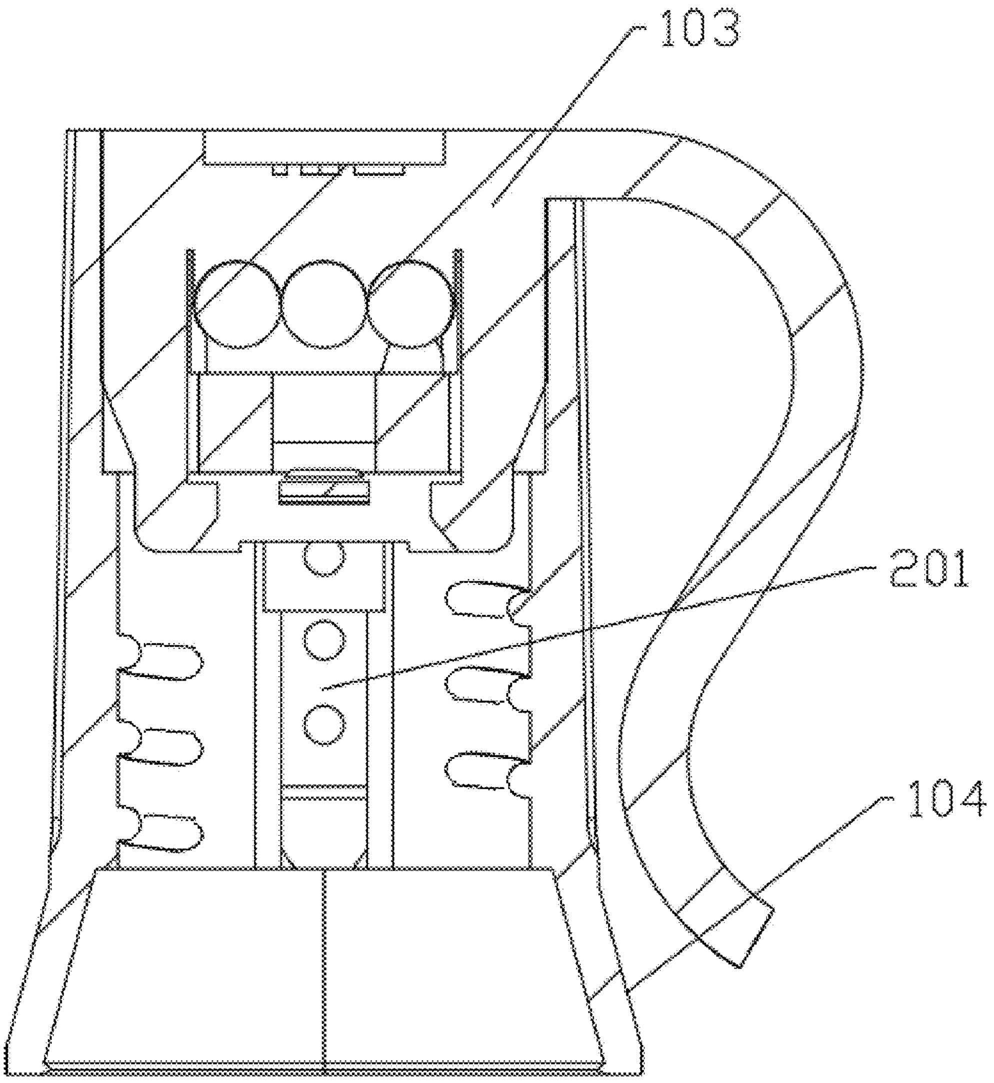
FIG. 5 is a sectional view of A-A in FIG. 4.
Figure 6:
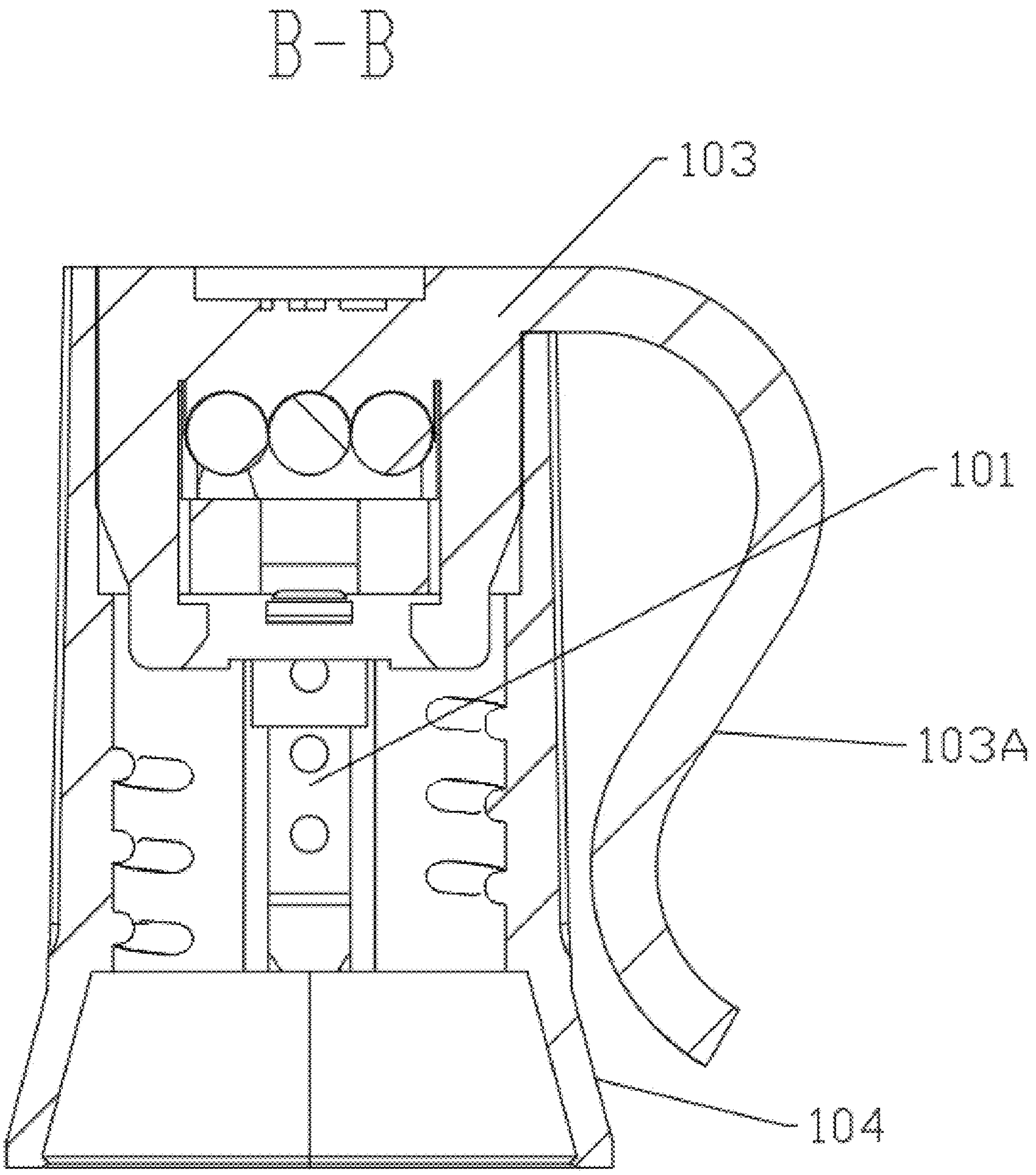
FIG. 6 is a sectional view of B-B in FIG. 4.
Figure 7:
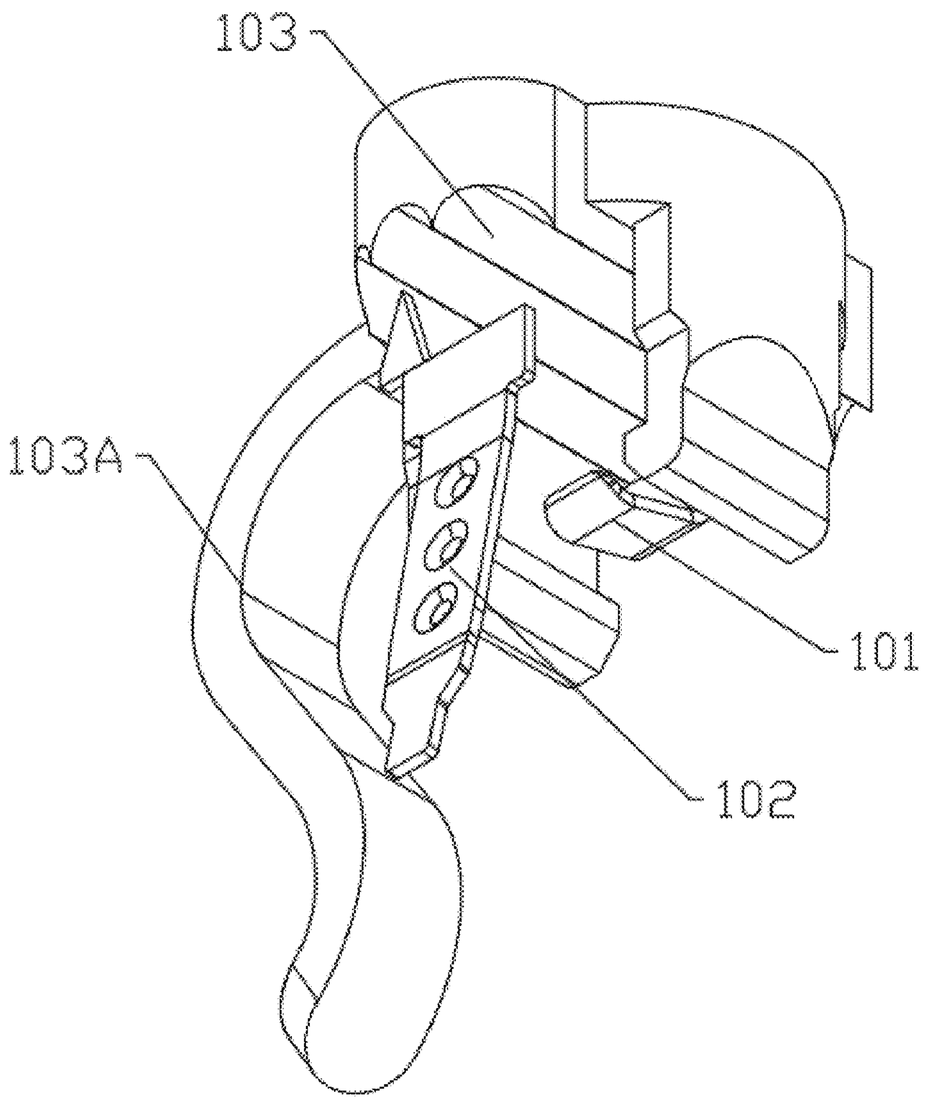
FIG. 7 is a diagram of position structures of a lamp cover, a conductive copper terminal and a conductive sheet of a three-wire dual-control light string according to the present disclosure.
Figure 8:
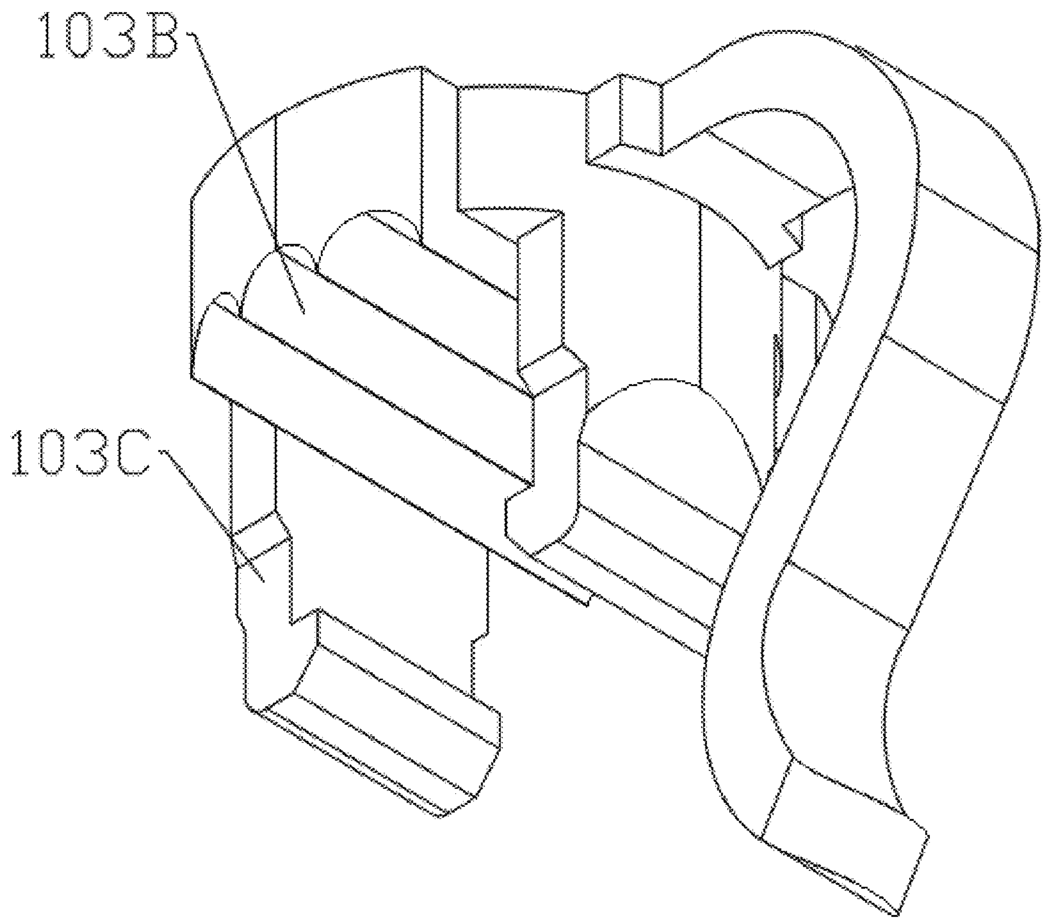
FIG. 8 is a perspective diagram of a lamp cover of a three-wire dual-control light string according to the present disclosure.
Figure 9:
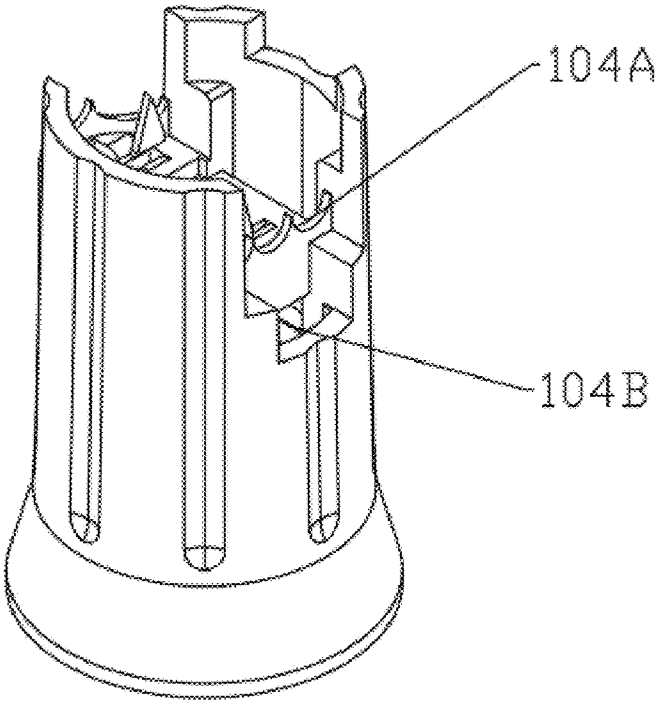
FIG. 9 is a perspective diagram of a lamp base of a three-wire dual-control light string according to the present disclosure.
Figure 10:
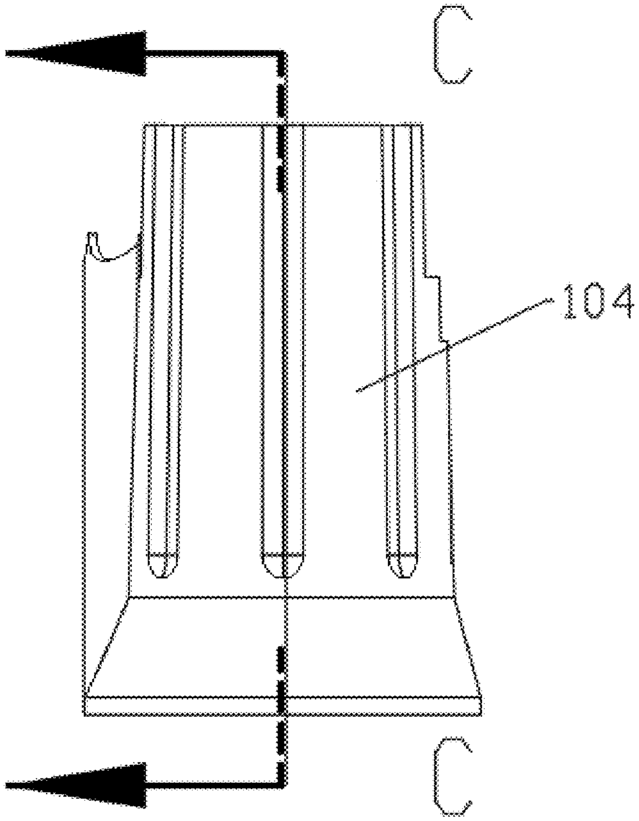
FIG. 10 is a front view of a cooperation between a lamp base and a conductive copper terminal of a three-wire dual-control light string according to the present disclosure.
Figure 11:
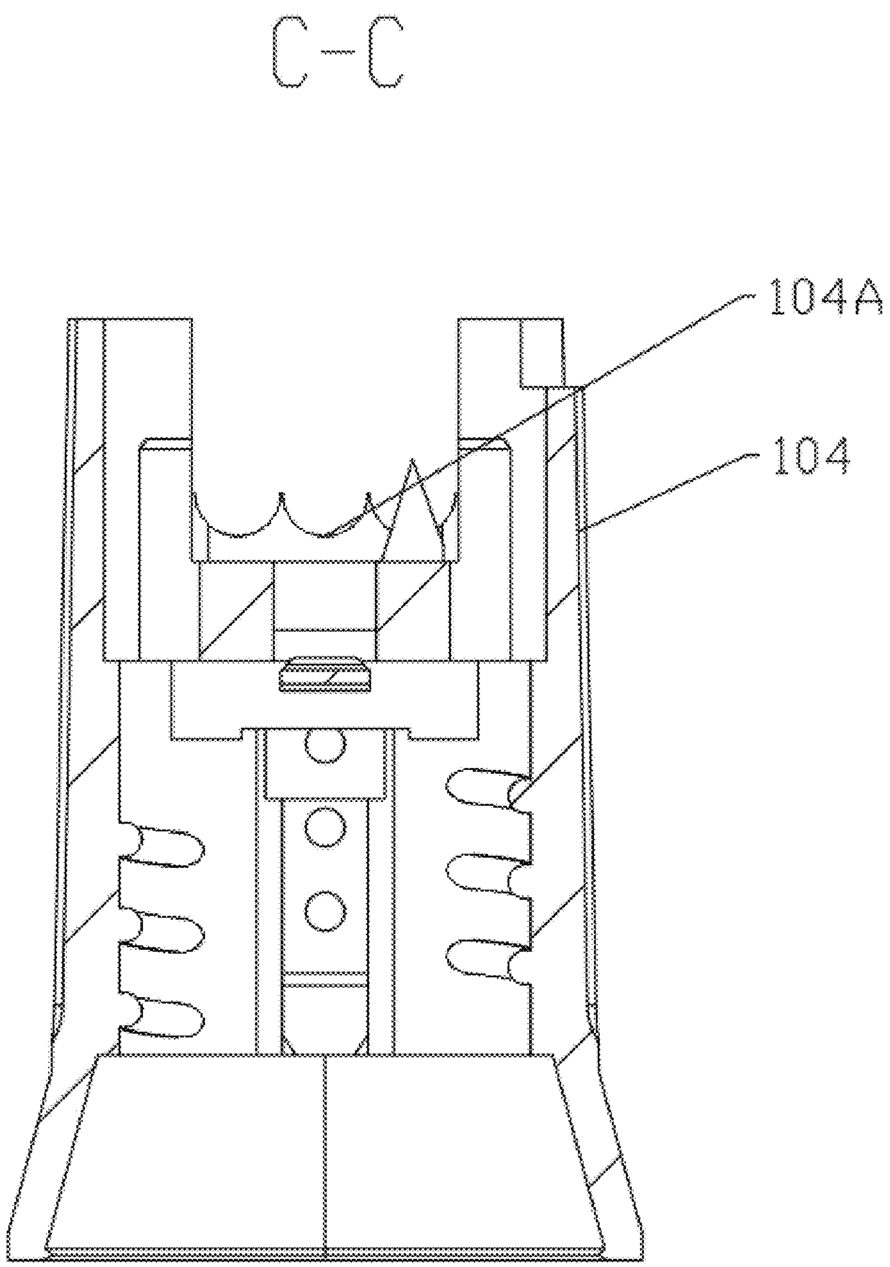
FIG. 11 is a sectional view of C-C in FIG. 10.
Figure 12:
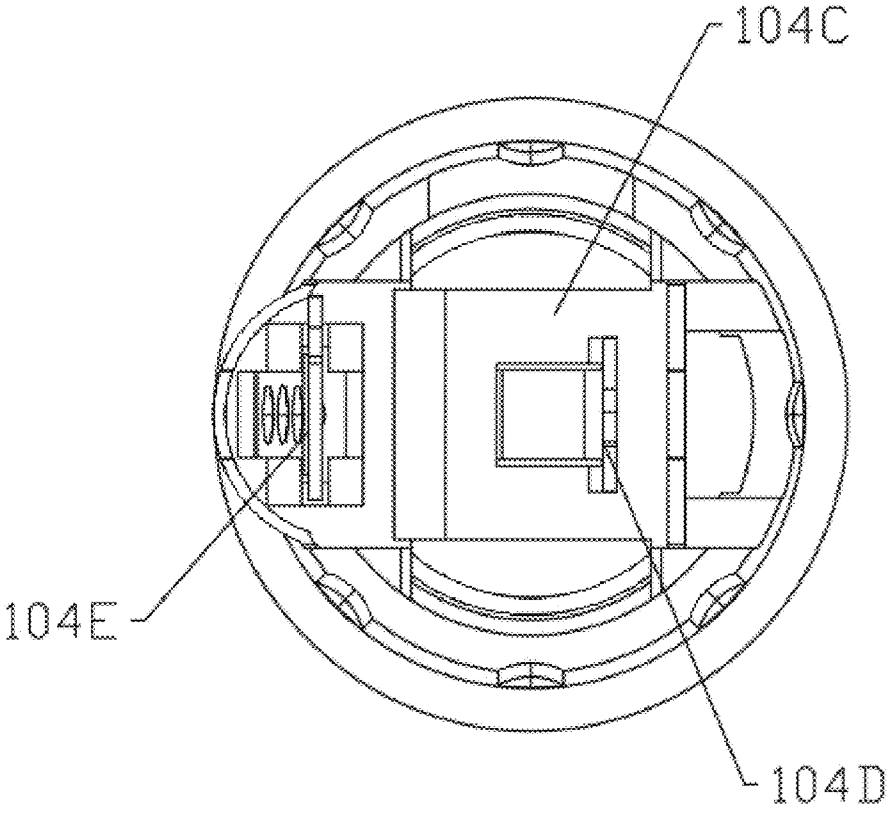
FIG. 12 is a top view of FIG. 10.
Figure 13:
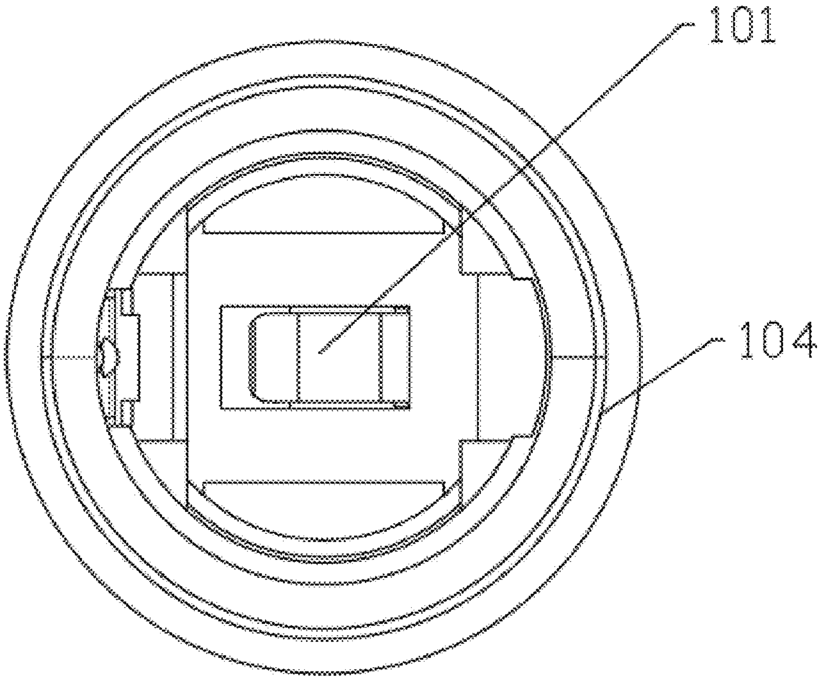
FIG. 13 is a bottom view of FIG. 10.
Figure 14:
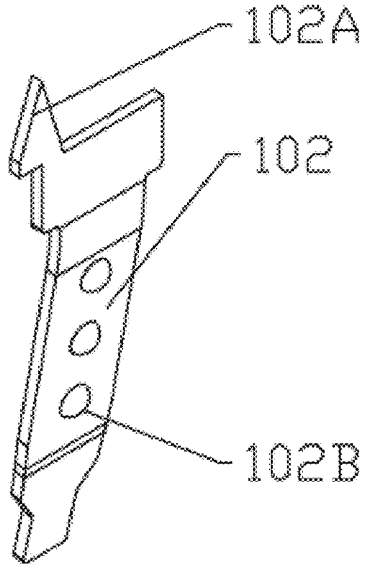
FIG. 14 is a structural diagram of a conductive sheet of a three-wire dual-control light string according to the present disclosure.
Figure 15:
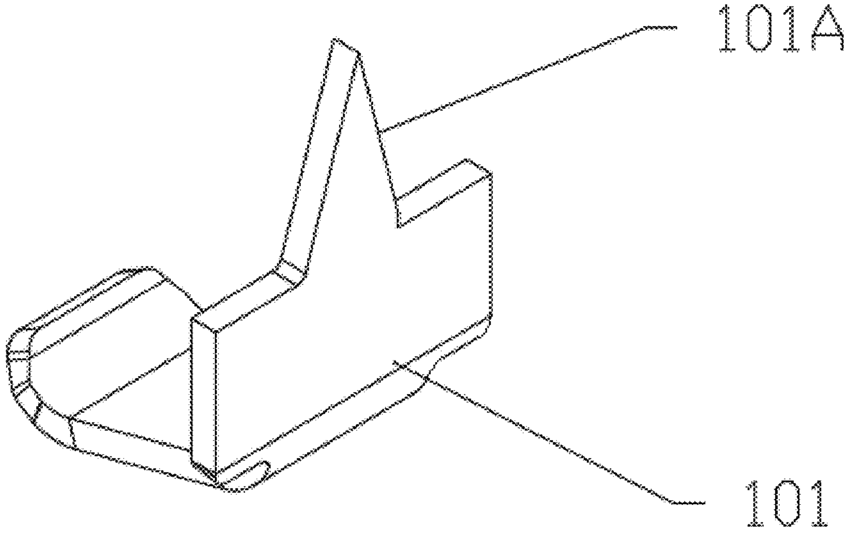
FIG. 15 is a structural diagram of a conductive copper terminal of a three-wire dual-control light string according to the present disclosure.
Figure 16:
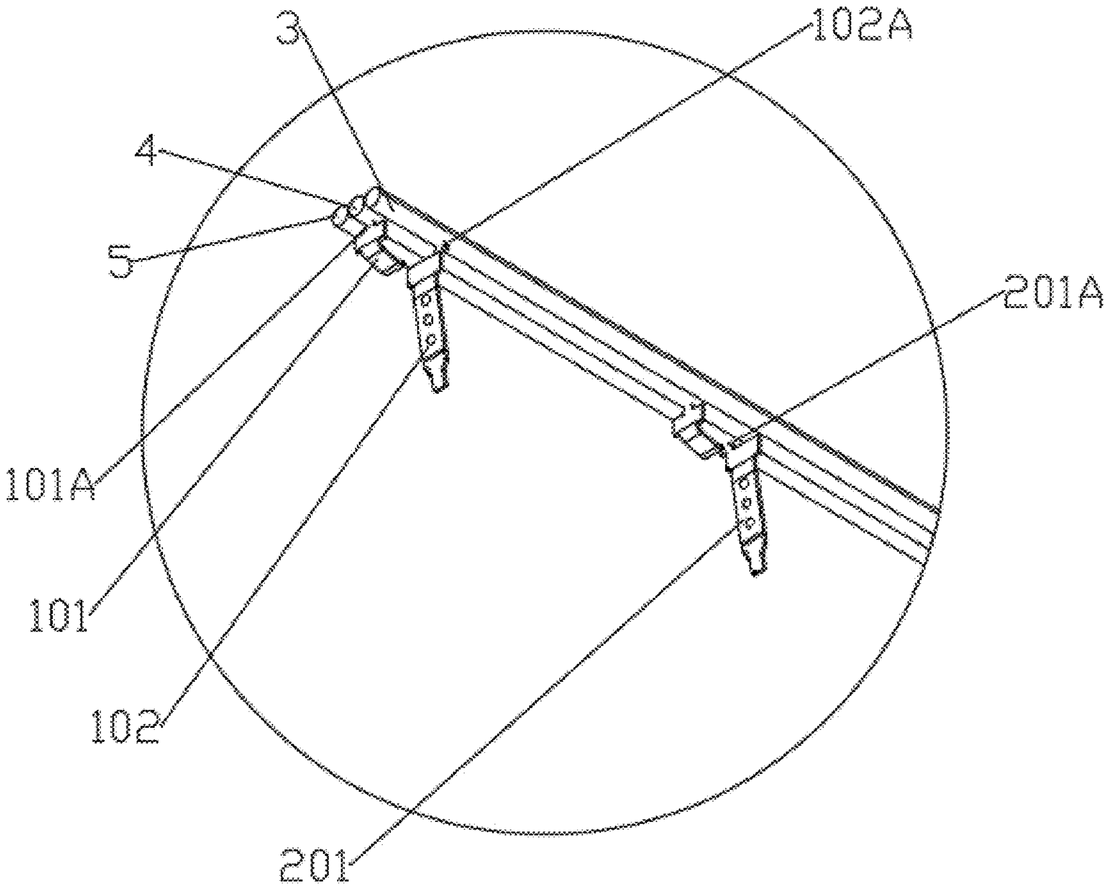
FIG. 16 is an enlarged view of a structure at D in FIG. 2.
Figure 17:
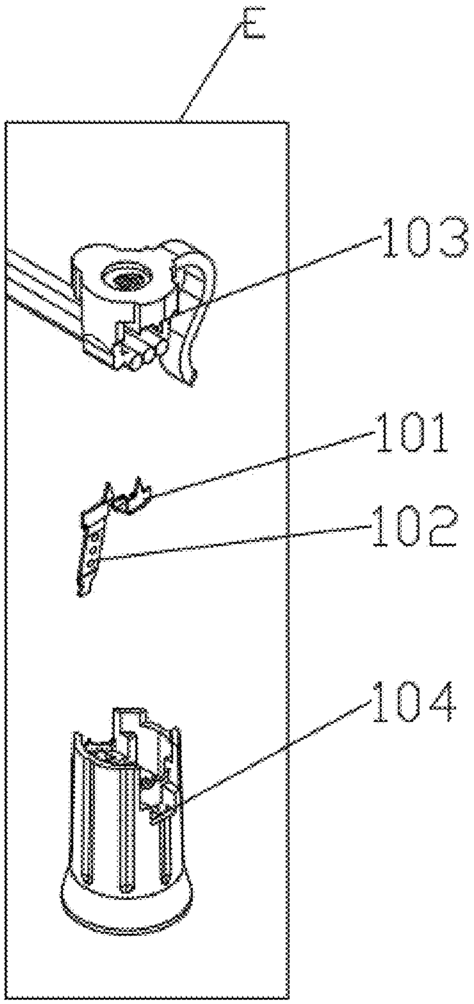
FIG. 17 is an enlarged view of a structure at E in FIG. 3.

With reference to FIG. 2 and FIG. 3, each of the first lamp holder 1 and the second lamp holder 2 includes a lamp base 104, a lamp cover 103 and a conductive copper terminal 104, the lamp base 104 is in snap-fit with the lamp cover 103, the three parallel conductors are clamped between the lamp base 104 and the lamp cover 103, and the conductive copper terminal 101 is connected to the second conductor 4. A first conductive sheet 102 is arranged on the lamp base 104 of the first lamp holder 1, a first tip portion 102A is formed on the first conductive sheet 102, and the first tip portion 102A is connected to the first conductor 3, where the first tip portion 102A is of a pointed triangular structure which penetrates into the first conductor 2 for electric conduction. A second conductive sheet 201 is arranged on the lamp base 104 of the second lamp holder 2, a second tip portion 201A is formed on the second conductive sheet 201, and the second tip portion 201A is connected to the third conductor 5, where the second tip portion 201A is of a pointed triangular structure which penetrates into the third conductor 5 for electric conduction. A difference between the first conductive sheet 102 and the second conductive sheet 201 is that the first tip portion 102A and the second tip portion 201A are arranged at different positions at top ends of the conductive bodies, which are located at left and right sides of the top ends of the conductive main body, respectively, and the second conductor 4 is a common-terminal conductor.

Through the foregoing schemes, the first conductor 3 and the second conductor 4 form a first loop control, and the second conductor 4 and the third conductor 5 form a second loop control. That is, the first loop first conductor 3 and the second conductor 4 form the first loop control for externally connecting a controller to control the flickering of the multiple first lamp holders 1, the second conductor 4 and the third conductor 5 form the second loop control for externally connecting the controller to control the flickering of the multiple second lamp holders 2, so that the three-wire dual-control light string can be implemented. Double-loop control can be implemented after the controller is externally connected, thereby achieving interval flickering between bulbs, and significantly improving the functionality and visual appeal of an outdoor light string.

With reference to FIG. 3 to FIG. 6, in some implementations, the lamp cover 103 is provided with three upper wire-clamping slots 103B side by side, the lamp base 104 is provided with three lower wire-clamping slots 104A side by side, and wire passing holes for clamping the three parallel conductors are formed after the lamp base 104 is in snap-fit with the lamp cover 103, thereby fixing the three parallel conductors.

With reference to FIG. 5 to FIG. 9, in some implementations, to facilitate the connection between the lamp cover 103 and the lamp base 104, a lower side of the lamp cover 103 is formed with a connecting latch tab 103C, and the lamp base 104 is provided with a connecting latch hole 104B corresponding to the lamp cover 103, and the connecting latch tab 103C is in snap-fit with the connecting latch hole 104B to assemble the lamp base 104 and the lamp cover 103 into a whole. A side edge of the lamp cover 103 is provided with a pothook 103A which is convenient to mount and dismount.

With reference to FIG. 9 to FIG. 13, in some implementations, an insulating partition 104C is arranged at an upper portion of the lamp base 104, the middle of the insulating partition 104C is provided with a first retaining socket 104D, and a side edge of the insulating partition 104C is provided with a second retaining socket 104E. The conductive copper terminal 101 is in clamped into the first retaining socket 104D and embedded into an inner top of the insulating partition 104C. The first conductive sheet 102 or the second conductive sheet 201 is embedded into the second retaining socket 104E and extends to an inner side surface of the lamp base 4. The conductive copper terminal 101 is embedded into a portion below the insulating partition 104C to be in contact conduction with the top of the lamp base, the first conductive sheet 102 or the second conductive sheet 201 is embedded into the second retaining socket 104E and extends to a portion of the inner side surface of the lamp base 104 to be in contact conduction with the side surface of the lamp base.

To facilitate conduction, in some implementations, a terminal body of the conductive copper terminal 101 is "L"-shaped, a conductive tip portion 101A is formed at an upper side the terminal body, and after the conductive copper terminal 101 is in snap-fit with the first retaining socket 104D, the conductive tip portion 101A is located above the partition and penetrates into the second conductor 4 for electric conduction.

With reference to FIG. 2, in some implementations, a conductive body of each of the first conductive sheet 102 and the second conductive sheet 201 is micro-arc shaped, the first tip portion 102A formed on the first conductive sheet 102 and the second tip portion 201A formed on the second conductive sheet 201 are formed on left and right sides of upper ends of the corresponding conductive main bodies, respectively, making the first tip portion 102A penetrate into the first conductor 3 for electric conduction and the second tip portion 201A penetrate into the third conductor 5 for electric conduction.

In some implementations, an upper side surface of the conductive body is provided with multiple contact protrusions 102B, and the contact protrusions 102*b* can make electric conduction with a bulb more stable. An inner side of the lamp base 104 is provided with threads for connecting the bulb, thereby facilitating the threaded connection with the bulb.

The foregoing is only a specific implementation of the present disclosure, but the scope of protection of the present disclosure is not limited thereto. Any change or substitution that can be easily thought of by any person skilled in the art within the technical scope disclosed in the present disclosure should be covered by the scope of protection of the present disclosure. Therefore, the scope of protection of the present disclosure shall be subject to the that of the appended claims.

What is claimed is:

1. A three-wire dual-control light string, comprising a plurality of first lamp holders, a plurality of second lamp holders, and three parallel conductors, wherein the plurality of first lamp holders and the plurality of second lamp holders are connected in parallel by the three parallel conductors, and the three parallel conductors are a first conductor, a second conductor and a third conductor;

each of the first lamp holder and the second lamp holder comprises a lamp base, a lamp cover and a conductive copper terminal; the lamp base is in snap-fit with the lamp cover, the three parallel conductors are clamped between the lamp base and the lamp cover, and the conductive copper terminal is connected to the second conductor; a first conductive sheet is arranged on the lamp base of the first lamp holder, a first tip portion is formed on the first conductive sheet, and the first tip portion is connected to the first conductor; and a second conductive sheet is arranged on the lamp base of the second lamp holder, a second tip portion is formed on the second conductive sheet, and the second tip portion is connected to the third conductor, wherein the first conductor and the second conductor form a first loop control, and the second conductor and the third conductor form a second loop control;

wherein a conductive body of each of the first conductive sheet and the second conductive sheet is micro-arc shaped, the first tip portion formed on the first conductive sheet and the second tip portion formed on the second conductive sheet are formed on left and right sides of upper ends of the corresponding conductive main bodies, respectively, making the first tip portion penetrate into the first conductor for electric conduction and the second tip portion penetrate into the third conductor for electric conduction;

wherein an upper side surface of the conductive body is provided with a plurality of contact protrusions;

wherein an inner side of the lamp base is provided with threads for connecting a bulb;

wherein a side edge of the lamp cover is provided with a pothook.

2. The three-wire dual-control light string according to claim 1, wherein the lamp cover is provided with three upper wire-clamping slots side by side, the lamp base is provided with three lower wire-clamping slots side by side, and wire passing holes for clamping the three parallel conductors are formed after the lamp base is in snap-fit with the lamp cover.

3. The three-wire dual-control light string according to claim 2, wherein a lower side of the lamp cover is formed with a connecting latch tab, and the lamp base is provided with a connecting latch hole corresponding to the lamp cover, and the connecting latch tab is in snap-fit with the connecting latch hole to assemble the lamp base and the lamp cover into a whole.

4. The three-wire dual-control light string according to claim 1, wherein an insulating partition is arranged at an upper portion of the lamp base, the middle of the insulating partition is provided with a first retaining socket, and a side edge of the insulating partition is provided with a second retaining socket;

the conductive copper terminal is in clamped into the first retaining socket and embedded into an inner top of the insulating partition;

the first conductive sheet or the second conductive sheet is embedded into the second retaining socket and extends to an inner side surface of the lamp base.

5. The three-wire dual-control light string according to claim 4, wherein a terminal body of the conductive copper terminal is "L"-shaped, a conductive tip portion is formed at an upper side of the terminal body, and after the conductive copper terminal is in snap-fit with the first retaining socket, the conductive tip portion is located above the partition and penetrates into the second conductor for electric conduction.

6. The three-wire dual-control light string according to claim 1, wherein an inner side of the lamp base is provided with threads for connecting a bulb.

* * * * *